US008493697B2

(12) United States Patent
Wallmeier

(10) Patent No.: US 8,493,697 B2
(45) Date of Patent: Jul. 23, 2013

(54) ARRANGEMENT FOR GROUND-FAULT DETECTION IN AN AC CIRCUIT AND POWER SUPPLY ARRANGEMENT WITH GROUND-FAULT DETECTION

(75) Inventor: Peter Wallmeier, Lippstadt (DE)

(73) Assignee: AEG Power Solutions B.V., Zwanenburg (NL)

( * ) Notice: Subject to any disclaimer, the term of this patent is extended or adjusted under 35 U.S.C. 154(b) by 12 days.

(21) Appl. No.: 13/298,852

(22) Filed: Nov. 17, 2011

(65) Prior Publication Data

US 2012/0257315 A1    Oct. 11, 2012

(30) Foreign Application Priority Data

Apr. 13, 2011  (EP) ..................................... 11162277

(51) Int. Cl.
*H02H 3/16*  (2006.01)
(52) U.S. Cl.
USPC .............................................. 361/42; 361/44

(58) Field of Classification Search
USPC ...................................................... 361/42–50
See application file for complete search history.

(56) References Cited

U.S. PATENT DOCUMENTS

| 4,068,276 | A  | * | 1/1978 | Pintell ............................. 361/46 |
| 7,359,167 | B2 | * | 4/2008 | Elms ............................... 361/42 |
| 2005/0024798 | A1 | * | 2/2005 | Reynoso et al. ................ 361/42 |

* cited by examiner

*Primary Examiner* — Danny Nguyen
(74) *Attorney, Agent, or Firm* — Norris McLaughlin & Marcus, P.A.; Christa Hildebrand

(57) ABSTRACT

The invention relates to an arrangement (10) for ground fault monitoring of an AC circuit between, on one hand, a neutral conductor (N') of the AC circuit and, on the other hand, a protective ground wire (PE) or a ground wire with a series connection of ohmic resistors (R1, R2, R3), which has a first terminal (101) for the neutral conductor (N') and a second terminal (102) for the protective ground wire (PE) or ground wire, wherein the arrangement includes at least one means for detecting a break of one of the resistors (R1, R2, R3) of the series connection.

15 Claims, 3 Drawing Sheets

ARRANGEMENT FOR GROUND-FAULT DETECTION IN AN AC CIRCUIT AND POWER SUPPLY ARRANGEMENT WITH GROUND-FAULT DETECTION

BACKGROUND OF THE INVENTION

Figure 1:
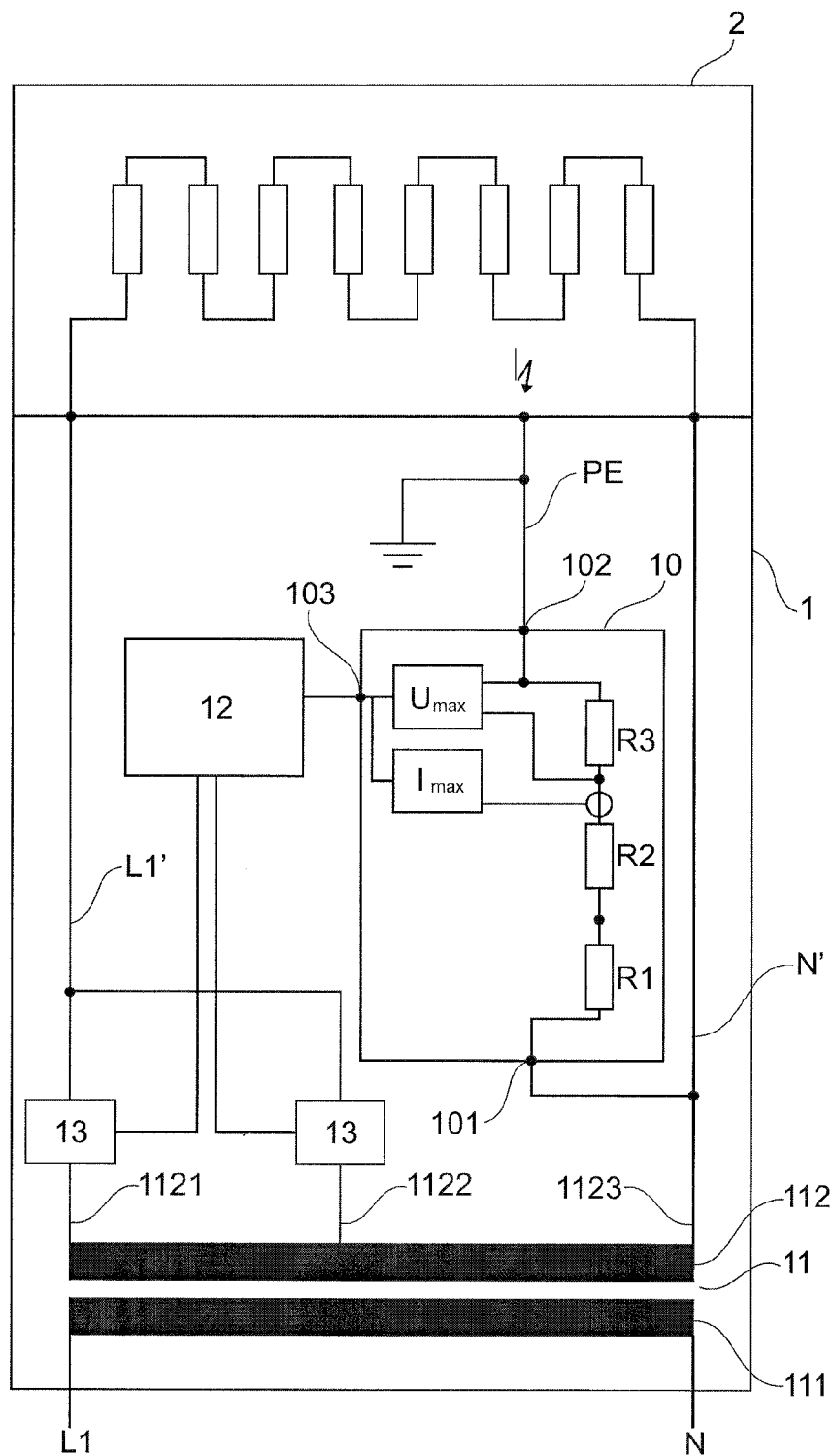

The present invention relates to an arrangement for ground-fault detection in an AC circuit between, on one hand, a neutral conductor of the AC circuit and, on the other hand, a protective ground wire or a ground conductor. Such arrangement with the reference number 10 is illustrated in FIG. 1. The arrangement has a series connection of ohmic resistors R1, R2, R3 with a first terminal 101 for the neutral conductor N' and a second terminal 102 for the protective ground wire PE or the ground conductor.

BRIEF SUMMARY OF THE INVENTION

The invention also relates to a current supply arrangement 1 for a polysilicon reactor which is also illustrated in FIG. 1. In the polysilicon reactor, a series connection of silicon rods or thin silicon rods for producing polysilicon according to the Siemens process is arranged. The series connection 2 is also shown in FIG. 1. The series connection 2 can be connected to the current supply arrangement 1 as a load. The current supply arrangement 1 includes a transformer 11 having a primary side 111, which can be connected to a power grid L1, N, and a secondary side 112 with several taps 1121, 1122, 1123, a controller 12, and an arrangement 10 for ground fault monitoring. A tap 1123 of the secondary side 112 is connected with a neutral conductor terminal of an output of the current supply arrangement 1, and at least two tabs 1121, 1122 are connected via power controllers 13 with a phase terminal of an output of the current supply arrangement. The terminals of the output are connected with a neutral conductor N' and with a phase conductor L1'. The power controllers 13 of the current supply arrangement 1 can be controlled with the controller 12 using voltage sequence control.

In the conventional arrangement for ground fault monitoring, as employed in the current supply arrangement 1 for a polysilicon reactor, a current flows in the event of a ground fault via the protective ground wire PE, the second terminal 102 of the arrangement 10, the series connection of ohmic resistors R1, R2, R3 to the first terminal 101 of the arrangement 10 for ground fault monitoring and hence to the neutral conductor N' of the current supply arrangement 1. The arrangement 10 for ground fault monitoring includes means $I_{max}$ for detecting a current, which detects a current flowing from the second terminal 102 to the first terminal 101 through the series connection of ohmic resistors R1, R2, R3. If a sufficiently high current flows through the series connection R1, R2, R3, then a ground fault is detected by the means $I_{max}$ for detecting the current.

The current flowing through the series connection of resistors R1, R2, R3 as a result of the ground fault causes at each resistor R1, R2, R3 of the series connection a voltage drop relative to the second terminal 102 of the arrangement for ground fault monitoring. In the conventional arrangements for ground fault monitoring, a means $U_{max}$ for detecting a voltage is therefore connected to at least one node 103 located between two resistors R2, R3 of the series connection, with the means $U_{max}$ detecting a voltage across the at least one of the resistors R3 and the second terminal 102 of the arrangement for ground fault monitoring.

The means $I_{max}$ for detecting the current and the means $U_{max}$ for detecting the voltage have outputs which are connected with the controller 12 of the current supply arrangement via a bus and an interface 103.

The signals supplied from the arrangement 10 via the interface 103 can be evaluated in the controller so as to initiate suitable measures in the event of a ground fault, for example switching the current supply arrangement 1 off.

An arrangement 10 for ground fault monitoring of the aforedescribed type in a current supply arrangement 1 for a polysilicon reactor of the aforedescribed type operates particularly reliably with a high-resistance connection between the neutral conductor N' and the protective ground wire PE across at least a portion of the series connection 2 of the silicon rods or thin silicon rods powered by the current supply arrangement 1. Fundamentally, a low-resistance connection between the neutral conductor N' and the protective ground wire PE via a portion of the series connection 2 of the silicon rods or silicon thin rods can also be detected with this type of arrangement 10 for ground fault monitoring. However, in this situation, the voltage drop between the neutral conductor N' and the protective ground wire PE may be so small that only a small current is driven through the series connection of the ohmic resistors R1, R2, R3 of the arrangement 10 for ground fault monitoring. Although the means $I_{max}$ for detecting the current flowing from the second terminal 102 to the first terminal 101 through the series connection of ohmic resistors R1, R2, R3 of the arrangement 10 for ground fault monitoring can fundamentally measure such small current, there is still the increased risk that the entire current supply arrangement 1 switches off due to short-circuits unrelated to safety or other extremely brief events, causing a termination or at least an undesirable interruption of the process for producing polysilicon. Therefore, the threshold which the current through the series connection of the ohmic resistors R1, R2, R3 must cross in order to trigger suitable safety devices and to switch the current supply arrangement off is set so high that short-circuits unrelated to safety or other extremely brief events do not cause the current supply arrangement to switch off. The arrangement 10 for ground fault monitoring therefore is not triggered by a low-resistance connection between the neutral conductor N' and the protective ground wire PE via a portion of the series connection 2 of the silicon rods or the thin silicon rods powered by the current supply arrangement.

Another disadvantage of the conventional arrangement 10 for ground fault monitoring is that the ground fault can no longer be detected if the series connection of resistors R1, R2, R3 breaks. It is therefore desirable to switch the current supply arrangement 1 off when a break in the series connection of resistors R1, R2, R3 of the arrangement 10 for ground fault monitoring is detected, because the ground fault monitoring of the current supply arrangement 1 then no longer functions properly.

The underlying problem to be solved by the invention is to improve an arrangement for ground fault monitoring so that low-resistance ground faults can be reliably differentiated from non-critical states and failures of the arrangement for ground fault monitoring through breaks in the series connection of ohmic resistors can also be detected.

The problem relating to the detection of breaks in the series connection of ohmic resistors is solved in that the arrangement has at least one means for identifying a break of one of the resistors of the series connection. If a break in the series connection occurs, then this break can be detected and a failure of the arrangement for ground fault monitoring causing the current supply arrangement to switch off can be indicated.

With respect to reliably identifying low-ohmic ground faults, the problem is solved in that the arrangement has a means for integrating a current flowing through the series connection from the first terminal to the second terminal. The energy dissipated through the ground fault can be determined by integrating the current. If this energy reaches a critical value, then a low-resistance ground fault can be reliably differentiated from a non-safety-related event.

Both solutions can be employed in conjunction or in parallel in an arrangement for ground fault monitoring.

A first of the means for detecting a break may include a first voltage source and a first coupling network, via which at least a first resistor of the resistors is connected to the first voltage source. The coupling network may be a transformer which galvanically separates a first voltage source from the first resistor. The first means for identifying a break may include a first means for detecting a current, which detects a current driven by the first voltage source through the first resistor. Alternatively, the first means for detecting a current may also measure the current flowing through the first voltage source.

The first means for detecting a break may also include a second voltage source and a second coupling network by which at least a second of the resistors is connected to the second voltage source. The second coupling network may also be formed by a transformer. The first means for detecting a break may include a second means for detecting a current which detects a current driven by the second voltage source through the second resistor. The second means for detecting a current may alternatively also detect the current flowing through the second voltage source.

The first resistor and the second resistor may be arranged in the series connection of the resistors directly one after the other. A common node is then provided between the resistors.

The sum of the voltage provided by the first voltage source and dropping across the first resistor and the voltage provided by the second voltage source and dropping across the second resistor is preferably equal to zero or approximately equal to zero. Since a break was detected, no voltage drop occurs across the series connection of the first resistor and the second resistor. However, a voltage drop occurs via the series connection of the first resistor and the second resistor in the event of a ground fault, which can be detected by a means for detecting a voltage, which may be part of the arrangement according to the invention.

An arrangement according to the invention may have at least one second means for detecting a break. The second means for detecting a break may have a third voltage source and a third coupling network, via which at least a third resistor of the resistors is connected to the third voltage source. The third coupling network can be formed by a transformer. The second means for detecting a break may include a third means for detecting a current, which detects a current driven through the third resistor by the third voltage source or a current through the third current source.

An arrangement according to the invention may include a fourth means for detecting a current, which detects a current flowing from the first terminal to the second terminal through the series connection.

The arrangement may have a branch which connects the first terminal, a node between two resistors of the series connection, an additional node between two resistors of the series connection and/or the second terminal and which includes a fourth voltage source and a controllable switch which can be controlled by a controller at discrete times to close. Advantageously, the first means for detecting a break and the second means for detecting a break are not operating at the discrete times. When the switch is closed, a current can be driven via the switch, the first terminal, a node between two resistors of the series connection, an additional node between two resistors of the series connection and/or the second terminal and hence via at least a portion of the series connection of the ohmic resistors. A fifth means for detecting a current can then detect a current flowing across the switch. If a current driven by the fourth voltage source does not flow in spite of the fact that the controllable switch is closed, then a break may be present in the series connection of the ohmic resistors of the arrangement according to the invention. The controllable switch may be a relay.

The means for detecting a current in an arrangement according to the invention may be current relays.

Additional features and advantages of the present invention will be described with reference to the appended drawings, which show in:

BRIEF DESCRIPTION OF THE SEVERAL VIEWS OF THE DRAWING(S)

Figure 2:
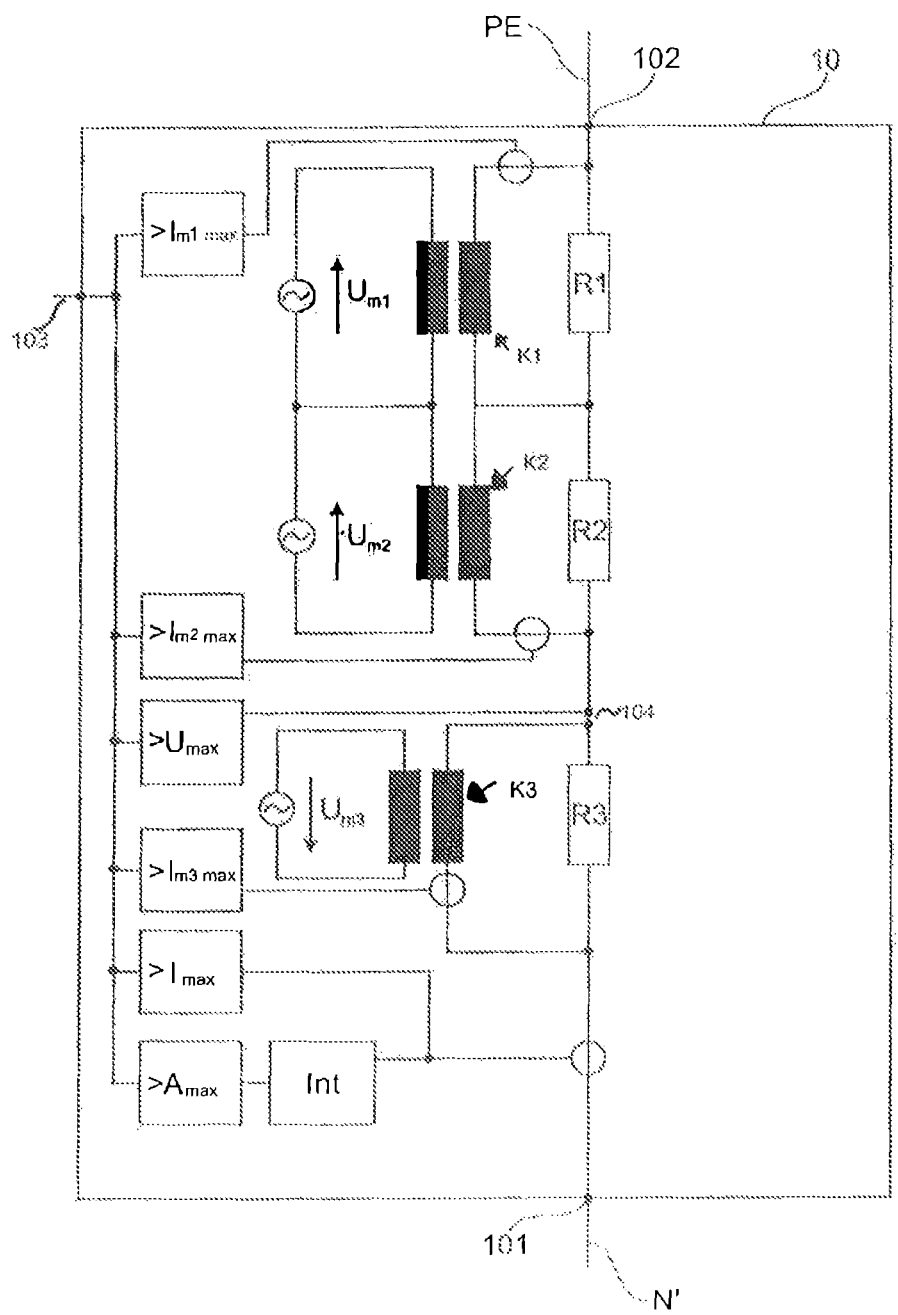
Figure 3:
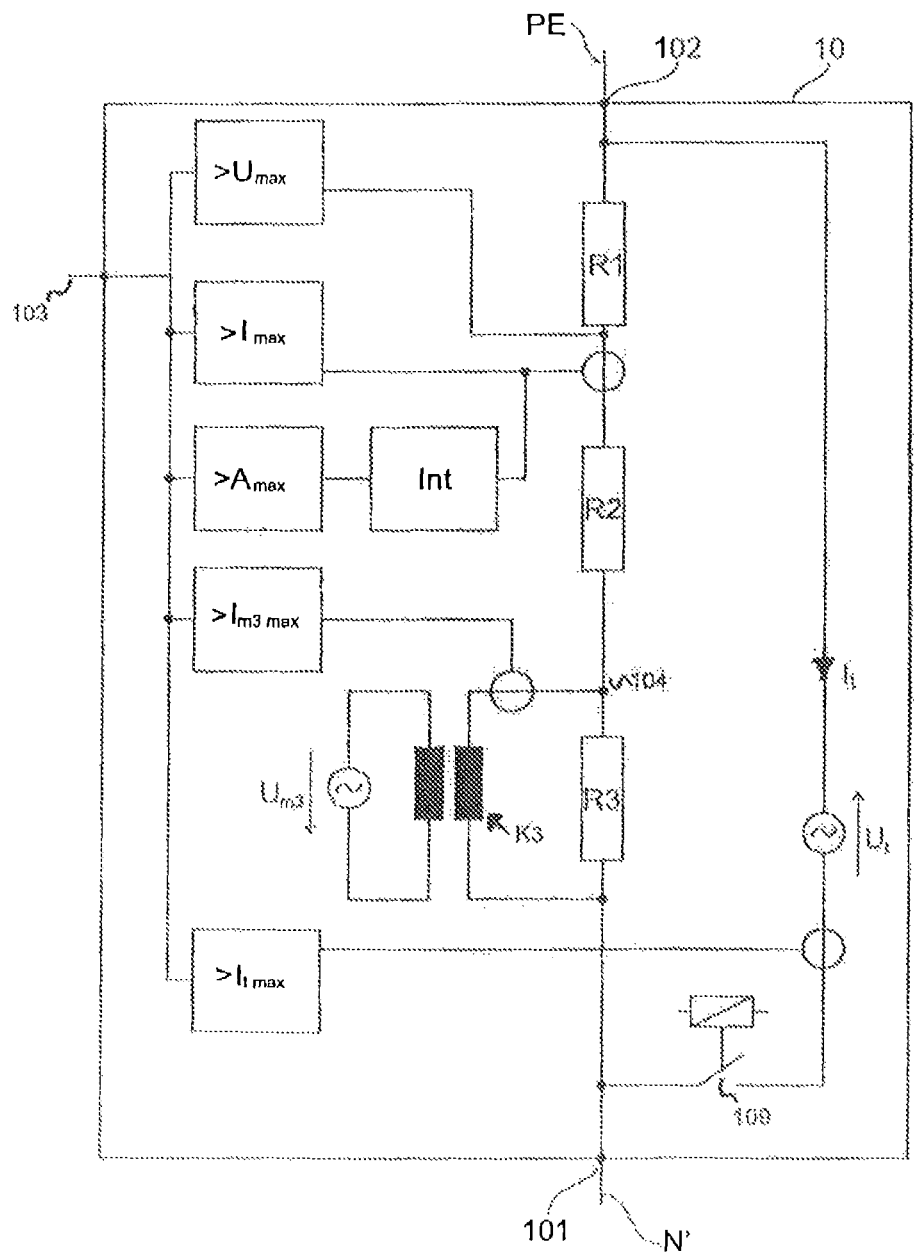

FIG. 1 a current supply arrangement for a polysilicon reactor,

FIG. 2 a first arrangement for ground fault monitoring according to the invention, and FIG. 3 a second arrangement for ground fault monitoring according to the invention.

DETAILED DESCRIPTION OF THE INVENTION

The arrangement is illustrated in FIGS. 1, 2, 3 for ground fault monitoring and current supply arrangements with ground fault monitors, respectively, have a large number of identical or functionally identical elements and components. These elements or components are labeled in the Figures with identical reference symbols. Elements, components and/or parts of the two arrangements according to the invention illustrated in FIGS. 2 and 3 may be entirely or partially combined with each other so as to create additional arrangement according to the invention.

The arrangements 10 for ground fault monitoring illustrated in FIGS. 2 and 3 may be employed in the current supply arrangement illustrated in FIG. 1 instead of the arrangement 10 for ground fault monitoring illustrated in FIG. 1.

The arrangement 10 for ground fault monitoring illustrated in FIG. 2 includes first means for detecting a break. The first means for detecting a break includes a first voltage source $U_{m1}$ and a first coupling network K1 formed by a transformer. The first voltage source $U_{m1}$ is connected to the primary side of the transformer K1. A first resistor R1 of the series connection of the resistors R1, R2, R3 of the arrangement 10 for ground fault monitoring is connected to the secondary side.

The first means for detecting a break further includes a second voltage source $U_{m2}$ and a second coupling network K2 also formed by a transformer. The second voltage source $U_{m2}$ is connected to the primary side of the transformer K2. A second resistor R2 of the series connection of the resistors R1, R2, R3 of the arrangement 10 for ground fault monitoring is connected to the secondary side.

The first voltage source $U_{m1}$, the second voltage source $U_{m2}$, the transformer K1 and the transformer K2 are arranged and the voltages supplied by the voltage source $U_{m1}$, $U_{m2}$ are dimensioned such that the secondary-site voltages cancel each other and no voltage drop of the sum voltage produced by the first voltage source $U_{m1}$ or the second voltage source $U_{m2}$ occurs across the series connection of the first resistor R1 and the second resistor R2. A voltage drop caused by an external voltage source for the first means for detecting a break may occur across the series connection of the first resistor R1 and the second resistor R2.

The first means for detecting a break furthermore includes a first means $I_{m1max}$ for detecting a current, for example a current relay, which detects a current $I_{m1}$ driven by the first voltage source $U_{m1}$ through the first resistor R1. For this purpose, the first means $I_{m1max}$ for detecting the current includes a measuring element 106 arranged in the circuit formed by the secondary side of the transformer K1 and the first resistor R1. The measuring element 106 is arranged in series with the secondary side of the transformer.

If the current $I_{m1}$ through the first resistor R1 is sufficiently large, then it is certain that the first resistor R1 is not broken. However, if there is no current $I_{m1}$, then it must be assumed that the first resistor R1 is defective.

The first means for detecting a break also includes a second means $I_{m2max}$ for detecting a current, likewise a current relay, which detects a current $I_{m2}$ driven by the second voltage source $U_{m2}$ through the second resistor R2. If the current $I_{m2}$ through the second resistor R2 is also sufficiently large, then it is certain that the first resistor R2 is not broken. However, if there is no current $I_{m2}$, then it must be assumed that the first resistor R2 is broken.

The second means $I_{m2max}$ for detecting the current has a measuring element 107 arranged in the circuit formed by the secondary side of the transformer K2 and the second resistor R2. The measuring element 107 is hereby arranged in series with the secondary side of the transformer K2, so that only the current $I_{m2}$ can flow through the measuring element 107.

The arrangement for ground fault monitoring illustrated in FIG. 2 furthermore includes a second means for detecting a break. The second means for detecting a break includes a third voltage source $U_{m3}$, a third coupling network K3 and a third means $I_{m3max}$ for detecting a current, which detects a current driven through the resistor R3 by the third voltage source $U_{m3}$. The third resistor R3 is connected to the third voltage source $U_{m3}$ via the coupling network K3 which is also formed by a transformer. The third means $I_{m3max}$ includes a measuring element 108 arranged in series with the secondary side of the transformer K3. The third means $I_{m3max}$ for detecting the current may also be a current relay.

If the third resistor R3 is not broken, then the third voltage source $U_{m3}$ can drive a current through the circuit formed by the secondary side of the transformer K3, the measuring element 108 and the third resistor R3. Conversely, if the third resistor R3 is broken, then this current can no longer flow. The third means $I_{m3max}$ for detecting the current detects this and indicates the break to the controller 12 of the current supply arrangement 1 via the output 103 of the arrangement.

The arrangement 10 according to the invention according to FIG. 2 further includes a fourth means $I_{max}$ for detecting a current, which detects a current flowing from the second terminal 102 to the first terminal 101 through the series connection R1, R2, R3. The fourth means $I_{max}$ includes a measuring element 109 arranged after the first terminal 101. The fourth means $I_{max}$ may also be a current relay. In the event of a ground fault, a current flows via the series connection of the resistors R1, R2, R3, which is detected by the fourth means $I_{max}$ and is indicated to the controller 12 of the current supply arrangement 1 via the terminal 103 of the arrangement 10.

The measuring element 109 is furthermore connected with a means Int for integrating, which integrates the measured current. The integration of the current flowing through the series connection of the resistors R1, R2, R3 represents the energy flowing during a ground fault. The amount of the dissipated energies can be used to distinguish ground fault from another non-safety-critical phenomenon.

Lastly, the arrangement illustrated in FIG. 2 includes a means $U_{max}$ for detecting a voltage, which detects a voltage drop between a node 104 located between the resistors R2 and R3 and the second terminal, i.e., the protective ground wire PE. If a current flows via the series connection of the resistors R1, R2, R3 due to a ground fault, then a voltage drop occurs across the series connection of the resistors R1, R2, R3. This voltage is detected by the means $U_{max}$ and may be used by the controller as an indication of a ground fault.

The arrangement 10 according to the invention illustrated in FIG. 3 corresponds substantially to the arrangement illustrated in FIG. 2. Unlike the arrangement illustrated in FIG. 2, the arrangement 10 illustrated in FIG. 3 does not include first means for detecting a break. Only the second means for detecting a break is provided, with which the third resistor R3 can be continuously monitored for a break.

Continuous detection of a break is then not performed for the resistors R1 and R2. However, a means is provided for testing the resistors R1 and R2 for a break at discrete times, for example before the current supply arrangement 1 supplies current to the series connection 2.

The means for detecting a break at discrete times includes a branch which connects the first terminal 101 and the node 104 with each other and which includes a fourth voltage source $U_t$ and a controllable switch 109 which can be controlled by a controller 12 at discrete times so as to close. When the switch is closed, the fourth voltage source $U_t$ drives a current $I_t$ via the switch 109 and the resistors R1 and R2. The current $I_t$ flowing through the branch is detected by a fifth means $I_{max}$ for detecting a current. In this way, it can be detected at the discrete times if the resistors R1 and R2 are broken or not. The output of the fifth means $I_{max}$ for detecting the current is connected with the controller 12 via the interface 103.

The invention claimed is:

1. An arrangement (10) for ground fault monitoring of an AC circuit between a neutral conductor (N') of the AC circuit, and a protective ground wire (PE) or a ground conductor, the arrangement comprising
a series connection of ohmic resistors (R1, R2, R3) having
a first terminal (101) for the neutral conductor (N') and a second terminal (102) for the protective ground wire (PE) or the ground conductor,
wherein the arrangement comprises at least one means for detecting a break of one of the resistors (R1, R2, R3) of the series connection.

2. The arrangement according to claim 1, wherein a first of the means for detecting a break comprises a first voltage source ($U_{m1}$) and a first coupling network (K1), via which at least a first resistor (R1) of the resistors (R1, R2, R3) is connected to the first voltage source ($U_{m1}$).

3. The arrangement according to claim 2, wherein the first means for detecting a break comprises a first means ($I_{m1max}$) for detecting a current, which detects a current ($I_{m1}$) driven through the first resistor (R1) by the first voltage source.

4. The arrangement according to claim 3, wherein the first means for detecting a break comprises a second voltage source ($U_{m2}$) and a second coupling network (K2), via which at least one second resistor (R2) of the resistors (R1, R2, R3) is connected to the second voltage source ($U_{m2}$).

5. The arrangement according to claim 4, wherein the first means for detecting a break comprises a second means ($I_{m2max}$) for detecting a current, which detects a current ($I_{m2}$) driven through the second resistor (R2) by the second voltage source ($U_{m2}$).

6. The arrangement according to claim 5, wherein the first resistor (R1) and the second resistor (R2) in the series connection of the resistors (R1, R2, R3) are arranged directly one after the other.

7. The arrangement according to claim 6, wherein the sum of the voltage supplied by the first voltage source ($U_{m1}$) and dropping across the first resistor (R1) and of the voltage supplied by the second voltage source ($U_{m2}$) and dropping across the second resistor (R2) is equal to zero or approximately equal to zero.

8. The arrangement according to claim 1, wherein the arrangement (10) comprises a second means for detecting a break and the second means for detecting a break comprises a third voltage source ($U_{m3}$) and a third coupling network (K3), via which at least a third resistor (R3) of the resistors (R1, R2, R3) is connected to the third voltage source ($U_{m3}$).

9. The arrangement according to claim 8, wherein the second means for detecting a break comprises a third means ($I_{m3max}$) for detecting a current, which detects a current ($I_{m3}$) driven through the third resistor (R3) by the third voltage source ($U_{m3}$).

10. The arrangement according to claim 1, wherein the arrangement comprises a fourth means ($I_{max}$) for detecting a current, which detects a current (I) flowing from the second terminal (102) to the first terminal (101) through the series connection of the resistors (R1, R2, R3).

11. The arrangement according to claim 1, wherein the arrangement comprises a means ($I_{nt}$) for integrating a current (I) flowing through the series connection of the resistors (R1, R2, R3).

12. The arrangement according to claim 1, wherein the arrangement (10) comprises a branch which is arranged in parallel to at least a portion of the resistors (R1, R2) of the series connection and which comprises a fourth voltage source ($U_t$) and a controllable switch (109) which is controlled with a controller (12) at discrete times to close.

13. The arrangement according to claim 12, wherein when the switch (109) is closed, the fourth voltage source ($U_t$) drives a current ($I_t$) across the switch (109).

14. The arrangement according to claim 12, wherein the arrangement (10) comprises a fifth means ($I_{tmax}$) for detecting a current, which detects the current ($I_t$) flowing across the switch (109).

15. A current supply arrangement (1) for a polysilicon reactor, comprising
a series connection (2) of silicon rods or thin silicon rods for producing polysilicon according to the Siemens process,
wherein the series connection (2) is connected to the current supply arrangement (1) as a load, with a transformer (11) having a primary side (111) for connecting to a power grid (L1, N) and a secondary side (112) having a plurality of taps (1121, 1122, 1123), wherein one tap (1123) is connected with a neutral conductor terminal of the output of the current supply arrangement and at least two taps (1121, 1122) are connected via power controllers (13) with a phase conductor terminal of the output of the current supply arrangement, with a controller (12) configured to control the power controllers (13) of the current supply arrangement (1) in voltage sequence control, and with an arrangement (10) for ground fault monitoring,
wherein the arrangement (10) for ground fault monitoring is constructed according to claim 1.

* * * * *